US006558722B2

(12) United States Patent  
Corriveau et al.

(10) Patent No.: US 6,558,722 B2
(45) Date of Patent: May 6, 2003

(54) USE OF POWDERED GUM IN MAKING A COATING FOR A CONFECTION

(75) Inventors: Christine L. Corriveau, Orland Park, IL (US); Gwendolyn Graff, DeKalb, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 35 days.

(21) Appl. No.: 09/908,422

(22) Filed: Jul. 18, 2001

(65) Prior Publication Data

US 2003/0026878 A1 Feb. 6, 2003

(51) Int. Cl.⁷ .............................. A23B 1/08; A23G 3/30
(52) U.S. Cl. ...................... 426/293; 426/289; 426/295; 426/3; 426/302; 426/455; 426/456; 424/440
(58) Field of Search .................. 426/3–6, 293, 426/295, 302, 289, 455, 456; 424/439, 440

(56) References Cited

U.S. PATENT DOCUMENTS

| | | |
|---|---|---|
| 810,210 A | 1/1906 | Laws |
| 1,516,398 A | 11/1924 | McDowell |
| 1,771,506 A | 7/1930 | Mustin |
| 1,786,606 A | 12/1930 | Gordon |
| 1,810,453 A | 6/1931 | Webster et al. |
| 3,262,784 A | 7/1966 | Bucher |
| 3,580,545 A | 5/1971 | O'Brien |
| 3,806,290 A | 4/1974 | Graff et al. |
| 3,857,963 A | 12/1974 | Graff et al. |
| 3,894,154 A | 7/1975 | Graff et al. |
| 4,000,321 A | 12/1976 | Mochizuki et al. |
| 4,050,406 A | 9/1977 | Reni |
| 4,156,740 A | 5/1979 | Glass et al. |
| 4,157,402 A | 6/1979 | Ogawa et al. |
| 4,238,510 A * | 12/1980 | Cherukuri et al. ............. 426/5 |
| 4,250,195 A * | 2/1981 | Cherukuri et al. ............. 426/5 |
| 4,269,860 A | 5/1981 | Ogawa et al. |
| 4,292,329 A | 9/1981 | Ogawa et al. |
| 4,399,154 A | 8/1983 | Puglia et al. |
| 4,428,927 A | 1/1984 | Ebert et al. |
| 4,466,983 A | 8/1984 | Cifrese et al. |
| 4,513,012 A | 4/1985 | Carroll et al. |
| 4,532,126 A | 7/1985 | Ebert et al. |
| 4,563,345 A | 1/1986 | Arrick |
| 4,601,907 A | 7/1986 | Knebl et al. |
| 4,640,218 A | 2/1987 | Motoyama et al. |
| 4,649,855 A | 3/1987 | Preis |
| 4,656,039 A | 4/1987 | Weiss et al. |
| 4,786,511 A * | 11/1988 | Huzinec et al. ................. 426/5 |
| 4,828,845 A * | 5/1989 | Zamudio-Tena et al. ....... 426/5 |
| 4,840,797 A * | 6/1989 | Boursier ..................... 424/475 |
| 4,863,745 A * | 9/1989 | Zibell ............................. 426/5 |
| 4,976,972 A * | 12/1990 | Patel et al. .................... 426/3 |
| 4,992,280 A | 2/1991 | Yung Chu et al. |
| 5,010,838 A | 4/1991 | Simelunas et al. |
| 5,017,385 A | 5/1991 | Wienecke |
| 5,206,042 A * | 4/1993 | Dave et al. ..................... 426/5 |
| 5,437,879 A | 8/1995 | Kabse et al. |
| 5,458,892 A | 10/1995 | Yatka et al. |
| 5,495,418 A | 2/1996 | Latini et al. |
| 5,498,429 A | 3/1996 | Orlandi et al. |
| 5,582,852 A | 12/1996 | Ahn et al. |
| 5,626,892 A | 5/1997 | Kehoe et al. |
| 5,972,374 A | 10/1999 | Theisen |
| 6,017,567 A | 1/2000 | Rosenplenter |
| 6,355,265 B1 * | 3/2002 | Ream et al. ................. 424/440 |
| 6,465,003 B2 * | 10/2002 | Ream et al. ................. 424/440 |

FOREIGN PATENT DOCUMENTS

WO     WO 97/02009     1/1997

* cited by examiner

*Primary Examiner*—Carolyn Paden
(74) *Attorney, Agent, or Firm*—Brinks Hofer Gilson & Lione

(57) ABSTRACT

A coating process for coating a plurality of centers comprising the steps of: (a) tumbling a plurality of centers in a rotating pan; (b) wetting said plurality of centers with a grossing syrup; (c) distributing said grossing syrup amongst individual centers by rotating said pan for a period of time after wetting; (d) applying a dry charge comprising a gum base and a powdered bulk sweetener on said plurality of centers to absorb said grossing syrup, thereby forming a plurality of powder-coated centers; (e) repeating steps (b) through (d) a predetermined number of times to obtain a plurality of grossed centers; and (f) drying said plurality of grossed centers.

22 Claims, No Drawings

USE OF POWDERED GUM IN MAKING A COATING FOR A CONFECTION

BACKGROUND OF THE INVENTION

The present invention relates to a process for applying a gum coating to edible, chewable or pharmaceutical centers by panning, and more particularly to the use of powdered gum in making a coating for a confection. As used herein, the term "powdered gum" refers to a chewing and/or bubble gum product having a dry, non-tacky, crumbly, friable form. The powdered, or friable, gum is easily rendered to finely-divided (powder or granular) form at room temperature which can be readily formed into a variety of desired shapes by compression.

Center-filled chewing gums prepared using an extruder are well known in the art. U.S. Pat. No. 3,857,963 issued to Graff et al. discloses forming a center-filled chewing gum by extruding a hollow-centered rope of chewing gum through an orifice having a pair of concentric conduits extending therethrough. U.S. Pat. No. 4,156,740 issued to Glass et al. discloses a sugarless center-filled gum wherein the sugarless chewing gum formulation can be extruded to form a hollow-centered rope. U.S. Pat. No. 4,269,860 issued to Ogawa et al. discloses a process for preparing a gas-developing chewing gum by using an extruder to fill a gas-developing composition into a chewing gum. U.S. Pat No. 4,399,154 issued to Pulia et al. discloses a co-extruded chewing gum, which includes an extruded center portion surrounded by and bounded to an extruded outer shell portion. U.S. Pat. No. 5,017,385 issued to Wienecke discloses a chewing gum candy product comprising a matrix of confectionery ingredients having distributed therein multiple discrete regions of a chewing gum composition together with multiple discrete regions of a hardboiled candy composition prepared by extrusion.

A problem encountered in the prior art is the need for extrusion equipment to produce center-filled chewing gum confection. The process of the present invention overcomes this problem by applying a gum coating to edible, chewable or pharmaceutical centers by panning.

So-called pan-coating, or panning, processes are also well known in the art. The process of sugar panning confectionery or pharmaceutical products involves the repetitive crystallization of sucrose or other sugar or syrup-like coating on a tumbling mass of centers. Thin crystal layers build upon each other to form the resulting shell or coating. Two classifications of panning include soft panning and hard panning. Hard panning differs from soft panning mainly in the specific sensory attribute achieved. Hard panning results in a crispy, crunchy coating whereas soft panning results in a softer, chewy coating.

Soft panning, or grossing, comprises the steps of coating edible centers with a coating solution by conventional methods using a rotating pan, sanding the wetted centers with a dry charge of fine crystal sugar, or the like, to form sanded centers. As the dry charge dissolves into the coating syrup the sanded centers become moist. Additional dry charge is added until the sugar, or the like, from the sanding step and the coating syrup from the wetting step reach equilibrium and the sanded centers do not absorb any more dry charge. The wetting and sanding steps are repeated until the desired size is achieved thereby forming grossed centers. The grossed centers are spread onto a drying tray typically for 12–24 hours to dry. A soft, chewy coating forms as a result of the glucose in the coating syrup interfering with, and retarding, any tendency for the sugar to re-crystallize.

One portion encountered with conventional soft-panning is that a dry charge that lacks a uniform composition produces an excessively rough coating. This occurs because the large particulate matter tends to collect towards the back of the pan.

Hard panning, or finishing, comprises the steps of wetting edible centers with one or more layers of a coating solution using a rotating pan and drying the wetted centers by exposure to ambient air or by providing a flow of air to harden each layer in preparation for the application of subsequent layers.

In each of the above disclosures, as well as general practice in the art, there is lacking a method for applying a gum coating, as well as successive outer coatings, to edible, chewable or pharmaceutical centers by panning.

Furthermore, a need still exists for an improved panning process using powdered gum to form a solid center-filled chewing gum having a uniform coating.

SUMMARY OF THE INVENTION

The present invention is a process for applying gum coating to edible, chewable or pharmaceutical centers. The process makes use of a powdered gum as the dry charge in soft panning, or grossing. The pan coating process of the present invention provides for forming a center-filled chewing gum by soft panning, or grossing, wherein a grossing syrup and a powdered gum dry charge are applied to a rotating mass of centers. A dry charge comprising a gum base and a powdered bulk sweetener is added to the revolving pan at room temperature. The process is repeated until a coating of the desired thickness and composition is obtained. Optionally, the product can be finished, waxed and glazed or retain its matte finish.

It is an advantage of the present invention to provide a process whereby edible, chewable or pharmaceutical centers can be provided with a gum coating, and optionally successive outer coatings, by panning.

It is an advantage of the preferred embodiment of the invention to provide a panning process for applying a gum coating by using a powdered gum dry charge at room temperature having a variable particle size distribution.

DETAILED DESCRIPTION OF THE PREFERRED EMBODIMENTS

The present invention is directed to a process for coating centers using a powdered gum wherein a grossing syrup is applied to a rotating mass of centers and then a powdered gum dry charge is added. The process is repeated until a coating of the desired thickness and composition is obtained. Thereafter, the grossed centers can preferably be finished, waxed and glazed.

The preferred process of the present invention is performed as follows. Edible, chewable or pharmaceutical centers are placed in a pan and rotated at a speed of about 5 to 40 rpm, preferably between about 10 and 30 rpm. Those of ordinary skill in the confectionery panning art will appreciate that the selection of the rotation speed of the pan is based on the type of center used in the panning operation. Typically the pans used are stainless steel pans that are either ribbed or baffled. If the centers comprise oils or have a high acid content, a sealant coat is applied as a pre-coat.

The grossing process begins by adding a small amount of grossing syrup to form a thin film on the surface of the centers. Most preferably, the amount of grossing syrup added is sufficient to cover the surface of the centers. Those of ordinary skill in the panning art will appreciate that the amount of grossing syrup added to form the thin film on the surface of the centers varies with the type of centers used. On the one hand, applying too little grossing syrup can result in a rough surface. On the other hand, applying too much grossing syrup results in the centers amassing together in the pan—a problem known as "doubling" in the art. Applying too much grossing syrup may also dissolve or melt the centers.

Typically, the selection of syrup temperature and concentration turns on the desired product quality and desired thickness of the coating. Syrup solids and application temperatures are about 60% to about 80% at about 140° F. (or 60° C.) for hot panning, about 65% to about 75% at about 80° F. (or 27° C.) for cold panning, and about 65% to about 67% at about 80° F. (or 27° C.) for finishing. Preferably, the grossing syrup has a concentration of about 75+/−10% solids, and more preferably a concentration of about 73+/−2% solids at about 125° F. (or 52° C.). Grossing syrups having sucrose, dextrose and sugarless compositions are known in the art, all of which are suitable for the process of the present invention. Non-limiting examples of sugarless grossing syrups include polyols, such as sorbitol, maltitol and mannitol solutions.

The process of the present invention achieves greatest success when the compositions of the grossing syrup and the dry charge are compatible, e.g. a dextrose grossing syrup used in combination with a dextrose based powdered gum. Most preferably, the process of the present invention uses a sucrose grossing syrup and a sucrose based powdered gum. Sucrose based compositions imparted superior chewing texture and a sweeter tasting gum. Similarly, if a sugarless confection is desired, a sugarless grossing syrup, such as sorbitol syrup, polyol syrup, mannitol syrup etc., is preferably used in combination with polyol based powdered gum.

Once the centers are wetted with the grossing syrup, the wetted cores are sanded with a dry charge of powdered gum until the cores have an even, light, powder-coating. The dry charge comprises a gum base and a powdered bulk sweetener. The dry charge may be added to the revolving pan at room temperature. Preferably, the dry charge has a temperature of about 50° F. to about 90° F. and an average particle size of about 16 to about 100 mesh, and more preferably about 40 to about 60 mesh. It is important not to overload the wetted cores with dry charge. If too much dry charge is applied to the wetted cores, the overload of dry charge collects in the back of the pan. As the lightly powdered centers rotate, the powdered gum is absorbed and the sanded centers "wet back," i.e. become moist. Additional powdered gum is added until the powder-coat is dry to the touch and does not absorb any more powdered gum. Those skilled in the art will recognize that the amount of dry charge added to the wetted cores, and the resulting thickness of the coating, depends upon the concentration of the syrup. The wetting and sanding steps are repeated until a desired size is achieved thereby forming grossed centers.

By repeating the described grossing process, coatings of from 1 to about 100 layers are easily obtained; preferably the number of layers is between 1 and 30, and most preferably 10. The optimal amount of layers will depend on the desired applications and can be determined without undue experimentation. The grossed centers are laid out in a drying tray typically for 24 hours and allowed to dry. The grossed centers comprise a confectionery or pharmaceutical product having a matte finish.

Optionally, the grossed centers can be finished. The finishing process achieves a smooth finish upon which a polishing agent may be applied. A finishing syrup is applied to a rotating mass of grossed centers in small amounts and forms a thin coating.

Typically, the finishing syrup has a concentration of about 70+/−10%. Preferably, the finishing syrup is a supersaturated solution at room temperature. Often, however, finishing syrups are heated to drive the solids into solution. As the finishing syrup is applied to the rotating centers, the syrup cools and the water that makes up the finishing syrup evaporates. This causes the solids to fall out of solution. As the solids precipitate, they crystallize onto the rotating centers to form a coating.

Therefore, the preferred finishing syrup concentration depends on the solubility of the constituents that make-up the finishing syrup. For example, sucrose has a solubility saturation level of about 67 w/w % in water at 25° C. (77° F.) and sucrose-based finishing syrups have a preferred concentration of about 70+/−5% solids at about 160° F. (or 71° C.); dextrose has a solubility saturation level of 51 w/w % in water at 25° C. (77° F.) and dextrose-based finishing syrups have a preferred concentration of about 70+/−5% at about 160° F. (or 71° C.); sorbitol, a polyol, has a solubility saturation level of 72 w/w % in water at 25° C. (77° F.) and sorbitol-based finishing syrup have a preferred concentration of about 70+/−10% at about 95° F. (or 35° C.).

The coated centers continue tumbling until dried and the coating process is repeated until a coating of the desired thickness and smoothness is obtained. Optionally, cool, dry air is blown onto the rotating centers to minimize finishing times. Preferably, the air temperature is maintained at or below about 59° F. (or 15° C.) and relative humidity at or below about 50%. Typically, a conventional 42 inch diameter pan requires an air system with a minimum air velocity of 500–700 cubic feet per minute. Preferably, the air velocity is adjustable to accommodate different applications. Panning with gum can be accomplished in large, automated systems known to those of ordinary skill in this art. Non-limiting examples of such automated systems include belt coaters, and large rotating drums.

By repeating the described finishing process, coatings of from 1 to 100 layers are easily obtained; preferably the number of layers is between 1 and about 5. The optimal amount of layers will depend on the desired application. For instance, if a thin coating is desired to merely seal the confection and provide luster, the preferred number of layers is about 5. Alternatively, by increasing the number of layers the composition of the finishing layer achieved can be varied from a crunchy candy coating to a hard candy outer coating. Preferably, the product surface is thoroughly and evenly dried while tumbling before polishing to optimize polishing.

Optionally, the finished centers can be polished. Polishing adds luster, intensifies natural color and improves appearance. The pans used for polishing the products of the present invention may be lined with a wax or wax blend to improve the efficiency of the polishing process. Preferably, a wax blend, comprising three parts bees wax and one part carnauba wax, is used to line the pans.

Polishing entails the application of starches, dry or liquid wax or wax blends, or gum acacia up to about 5% by weight of the finished centers, preferably up to about 3% and most preferably up to about 0.5%. Starches include, but are not limited to, dextrin and modified starches. Waxes include, but are not limited to, synthetic (e.g. polyethylene and Fisher Tropsch waxes), natural (candelilla carnauba, beeswax, rice bran or mixtures thereof) and petroleum (e.g. microcrystalline and paraffin). The waxes can be applied in crystalline form or dissolved in food grade organic solvents such a alcohol or D-limonene. Mineral or vegetable oils can be added to facilitate the polishing process.

Preferably, cool, dry air is used to minimize polishing times. More preferably, the air temperature is maintained at or below about 59° F. (or 15° C.) and relative humidity at or below about 50%. Preferably, a conventional 42 inch diameter pan requires an air system with a minimum air velocity of 500–700 cubic feet per minute. Most preferably, the air velocity is adjustable to accommodate different applications.

Those of ordinary skill in the art will appreciate that the lower the solids concentration, the lower the temperature of the syrup and the lower the temperature of the blowing air, the lower the blowing air flow rate, and the slower the pan speed results in a smoother confection surface and more stable colored coatings that are less likely to fade but also results in a longer panning process.

Optionally, confectioner's glazes also can be applied to the finished and or waxed pieces. Typically, confectioner's glazes are solvent based. For this reason, after the glaze is applied to the rotating mass of finished centers a flow of air is provided to "flash-off" any solvents. Alternatively, the glazed centers can be "aired" in well-ventilated trays for about 18–24 hours prior to packaging to allow any solvents to evaporate. Glazes may include, but are not limited to shellacs or zein lacquers. Glazes, when used, generally constitute up to about 0.1 to about 0.3% by weight of the finished product.

Preferably, the powdered gum dry charge used in the present invention is prepared by mixing between about 5 to about 40% of a specialty gum base used to make powdered gum and abut 50 to about 95% bulk sweetener, more preferably between about 10 to about 30% of a specialty gum base used to make powdered gum and about 70 to about 90% bulk sweetener, most preferably, between about 15 to about 25% of a speciality gum base used to make powdered gum and about 75 to about 85% bulk sweetener.

Powdered, or friable, gums and speciality gum bases used to manufacture powdered gums are known in the art. Sucrose based, dextrose based and sugarless powdered gums are also known in the art. By way of example, a method for making a powdered or friable gum is disclosed in U.S. Pat. No. 3,262,784. A preferred specialty gum base for powdered gum of the bubble variety can be obtained from Cofosa Gum, S. A., under the brand name Delta T™. Cafosa Gum, S. A. also sells, under the brand name Balear T™, a preferred specialty gum base for making powdered gum of the chewing variety. Eurobase, a Belgium company, sells a sugarfree specialty gum base for powdered gum under the brand name Micro D™. The specialty gum bases can be obtained in pelleted, slab or shredded form, all of which are suitable for the process of the present invention. Specialty gum bases in pelleted or slab form may be size-reduced. Most preferably, the specialty gum base for powdered gum is in shredded form.

Bulk sweeteners are well-known in the art and may include both sugar and sugarless sweeteners and components, or combinations thereof. Sugar sweeteners may include saccharide containing components including, but not limited to, sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners may include, but are not limited to, sugar alcohols such as sorbitol, mannitol, xylitol, hydrogenated starch hydrolysates, malititol, and the like, alone or in combination.

High intensity sweeteners may also be present and are commonly used with sugarless sweeteners. When used, high intensity sweeteners typically constitute between about 0.001 to about 5% by weight of the gum portion of the coating, preferably between about 0.01 to about 1% by weight of the gum portion of the coating. Typically, high intensity sweeteners are at least 20 times sweeter than sucrose. These may include, but are not limited to, sucralose, asparatame, salts of acesulfame, alitame, saccharine and its salts, cyclamic acid and its salts, dihydrochalcones, thaumatin, monellin, and the like, alone or combination.

Colorants impart desired color characteristics or remove any undesired color by whitening the gum portion of the coating. Liquid or powdered coloring agents may be added during mixing of the powdered gum. Optionally, powdered coloring agents also may be applied by addition to the powdered gum dry charge. Preferably, coloring agents comprise between about 0.001 to about 5% by weight of the powdered gum dry charge. Coloring agents may also be applied by addition to the grossing syrup and the finishing syrup. When used, the coloring agents are generally present in amount of between about 0.001 to about 15% by weight of the grossing syrup and/or, the finishing syrup. Colorants and whiteners may include, but are not limited to, FD&C-type dyes and lakes, fruit and vegetable extracts, titanium dioxide or mixtures and/or dispersions thereof.

In general, flavor should be present in the gum portion of the coating in an amount within the range of about 0.1 to about 15% by weight of the gum portion of the coating, preferably between about 0.2 to about 5% by weight of the gum portion of the coating, most preferably between about 0.5 to about 3% by weight of the gum portion of the coating. Liquid or spray-dried flavorings can be added to the powdered gum during mixing. Alternatively, spray-dried flavorings can be applied to the powdered gum. The centers can comprise the same flavor or a different flavor from the coating such that the combination of center and coating impart a desired flavor blend.

Additionally flavorings, either liquid or spray-dried, can be added while panning. Preferably, the flavorings are applied after the syrup over the course of grossing. Most preferably, the amount of flavor added is divided into four aliquots, e.g. after ¼, ½, etc. of the grossing process. Although it is not preferred, flavor can be added directly to the grossing syrup. The addition of flavor directly to the grossing syrup, however, may result in a loss of many valuable volatiles due to evaporation.

Flavoring agents may include essential oils, synthetic flavors or mixtures thereof including, but not limited to, flavoring aromatics, oleo resins, extracts derived from plants, leaves, flowers, fruits and so forth, and combinations thereof as known by those of ordinary skill in this art. By way of example, flavor oils include: oils derived from plants and fruits, peppermint oil, spearmint oil, cinnamon oil, other mint oils, clove oil, oil of wintergreen, anise and the like. Also useful are artificial, natural or synthetic fruit flavors such as citrus oils including lemon, orange, grape, lime and grapefruit and fruit essences including apple, strawberry, cherry, pineapple and so forth. Natural and artificial flavoring agents may be combined in any sensorial acceptable fashion.

If desired, acidulants or food acids may also be added while panning to impart a tart or sour flavor. Preferably, acidulants are added to only the first layer of the grossing process. Optionally, acidulants may also be added in the powdered gum itself. When present, acidulants are generally present in amount of about 0.001 to about 5% by weight of the gum portion of the coating. Acidulants may include, but are not limited to, citric acid, malic acid, tartaric acid and the like, as well as mixtures thereof. In cases where the center and/or powdered gum dry charge comprises a fruit or citrus flavor, it may be most desirable to include at least one of these acidulants in the powdered gum coating to impart a tartness to the overall taste of the gum portion of the coating.

The process of the present invention can be applied to edible chewable or pharmaceutical centers such as pressed dextrose, hard candy, gum, taffy, fondant, dehydrated marshmallow, fruits, cordials, pre-panned confections, nuts, lozenges and medicinal tablets. Due to the nature of the gum coating, however, the use of proteinaceous or fat-containing centers are not preferred as they can plasticize the gum coating. The amount of coating can vary from about 5–95% of the product weight depending on the desired size and application.

The present invention is further illustrated by way of the following example.

EXAMPLE

A non-limiting example of the preferred embodiment of the invention is next described. A hot cinnamon gum-coated cinnamon imperial in accordance with the present invention was prepared using lab scale equipment as follows. The product contains a hot cinnamon imperial in the center with a hot cinnamon gum coating of about 75% of the total piece weight on the exterior. This grossed piece was then finished with a sucrose finishing syrup, waxed and glazed. The gumball was generally spherical, although variations in the center material often lead to a variety of shapes in the end product.

| Powdered Gum Dry Charge | |
|---|---|
| | Percentage by Weight |
| Delta T ™ Gum Base | 18.50 |
| Powdered Sugar | 79.89 |
| Color | 0.20 |
| Spray-dried flavor | 1.41 |

The above formulation was used for the powdered gum dry charge. The powdered gum dry charge was prepared using an unheated double sigma mixer. The gum base in shredded form, color, and one-third of the powdered sugar was added and mixed for approximately 5–7 minutes. As the powdered sugar incorporated into the mixture, an additional one-third of the powdered sugar was added and the mixture was mixed. At the time the mixture appeared homogenous, the final one-third of the powdered sugar was added and blended until a uniform, fine powder was obtained. The total mixing time was about 25 minutes. The mixture was sifted to separate the fines from the overs. The overs were ground and added back into the mixture. Thereafter, the spray-dried flavor was added and blended by hand with the above mixture. The resulting powdered gum dry charge was ready for grossing. A sieve analysis of the powdered gum dry charge was as follows:

| Sieve Analysis | |
|---|---|
| | Percentage by Weight |
| Less than 100 mesh | 14.25 |
| 80–100 | 2.07 |
| 60–80 | 7.54 |
| 40–60 | 13.27 |
| 20–40 | 27.27 |
| 16–20 | 21.07 |
| <16 | 14.53 |

An unexpected advantage of the present invention is the ability to gross a dry charge having a broad range of particle sizes. Preferably, the dry charge has an average particle size of about 40 to about 60 mesh.

| Grossing Syrup Preparation | |
|---|---|
| | Percentage by Weight |
| Granulated sugar | 32.53 |
| Water | 19.28 |
| 42 DE Corn Syrup | 48.19 |

The above formulation was used for the grossing syrup in the grossing, or soft panning, process. The sugar, water and corn syrup was combined and heated to about 195° F. The mixture was allowed to cool to about 160° F. to obtain a grossing syrup having a concentration of about 73+/−2% solids, as measured with a refractometer.

| Finishing Syrup Preparation | |
|---|---|
| | Percentage by Weight |
| Granulated sugar | 60.00 |
| Water | 40.00 |

The above formulation was used for the finishing syrup in the finishing, or hard panning, process. The sugar and water was combined and heated to about 195° F. The mixture was allowed to cool to about 160° F. to obtain a finishing syrup having a concentration of about 65+/−2% solids, as measured with a refractometer.

| The Grossing Process The following ingredients were used in the grossing process: | |
|---|---|
| | Percentage by Weight |
| Center: Panned Hard Candy | 25.94 |
| Grossing Syrup | 17.46 |
| Red 40 Dye | 00.12 |
| Gum Powder | 56.48 |

Step 1. Color was added to the grossing syrup and mixed. The pan was pretreated with the grossing syrup to prevent the powdered gum from sticking and causing cleanup to be difficult. To pretreat the pan, the interior walls of the pan were coated with the grossing syrup.

Step 2. The centers were placed in the pan and rotated at a speed of about 20 rpm.

Step 3. The rotating centers were wetted with about ⅛$^{th}$ of the grossing syrup.

Step 4. The centers were rotated for about 45 seconds to form a thin coating on the surface of the centers.

Step 5. The centers were sanded with powdered gum to form a light powder-coat. Care was taken to avoid adding excessive powdered gum.

Step 6. The lightly, powder-coated centers were allowed to rotate and "wet-back."

Step 7. Additional powdered gum was added to form a light, powder-coat. Again the coated centers were allowed to rotate and "wet-back."

Step 8. The process was continued until the powdered gum coating was dry to the touch and the centers did not absorb additional powdered gum.

Step 9. Steps 3–8 were repeated the desired amount of times to produce a desired size. This particular application required 10 coats.

Step 10. The grossed centers were laid out on a drying tray and dried for about 24 hours.

The Finishing Process
The following ingredients were used in the finishing process:

| | Percentage by Weight |
|---|---|
| Gum Grossed Centers | 96.63 |
| Finishing Syrup | 2.76 |
| Red 40 Dye | 0.02 |
| Wax | 0.18 |
| Glaze | 0.41 |

At time zero, 2400 grams of grossed centers were added to a 16-inch diameter, lab scale pan and rotated at a speed of about 20 rpm. After one minute, a small amount, about 26.25 grams, of colored finishing syrup was added. After about four minutes, a supply of cold air having a velocity of about 110 cubic feet per minute was provided for about 5 minutes to dry the coating. The process was repeated the desired amount of times to produce a coating of the desired thickness and composition. This particular application required four applications of finishing syrup. After the fourth application of finishing syrup, the finished center was allowed to dry completely without supplying cold air. After the finished center was dry, a wax was added and the speed of the rotating centers was increased to about 30 rpm. A supply of cold air having a velocity of about 110 cubic feet per minute was supplied to flash off any solvent and the waxed centers were tumbled until they appeared shiny. Subsequently, a glaze was applied to the rotating polished centers and a supply of cold air was supplied to flash off any solvents. The glazed centers were removed from the pan when they were dry. A total of about 58 minutes was required for the finishing process.

It is to be understood that the embodiments herein described are merely illustrative of the principles of the present invention. Those skilled in the art may make various modifications without departing from the spirit or scope of the claims that follows:

What is claimed is:

1. A coating process for coating a plurality of centers comprising the steps of:
    a) tumbling a plurality of centers in a rotating pan;
    b) wetting said plurality of centers with a grossing syrup;
    c) distributing said grossing syrup amongst individual centers by rotating said pan for a period of time after wetting;
    d) applying a dry charge comprising a gum base and a powdered bulk sweetener on said plurality of centers to absorb said grossing syrup thereby forming a plurality of powder-coated centers;
    e) repeating steps (b) through (d) to obtain a plurality of grossed centers; and
    f) drying said plurality of grossed centers.

2. The process of claim 1 wherein at least one colorant is mixed into said grossing syrup before said grossing syrup is applied in step b).

3. The process of claim 1 wherein step d) further comprises the sequential steps of:
    allowing said plurality of powder-coated centers to turn in said rotating pan and wet-back;
    applying additional dry charge to absorb said grossing syrup to form a plurality of gum-coated centers; and
    continuing to add said additional dry charge until said plurality of gum-coated centers do not absorb said additional dry charge.

4. The process of claim 1 wherein step d) further comprises, the sequential steps of:
    dividing said amount of said dry charge added in step d) into a small portion of said dry charge added in step d) and a remaining portion of said dry charge added in step d);
    adding said small portion of said dry charge added in step d) on said plurality of centers;
    on a first layer only, applying an acid on said plurality of centers; and
    adding said remaining portion of said dry charge added in step d) to form a plurality of lightly, powder-coated centers.

5. The process of claim 1 further comprising the sequential steps of:
    g) adding a plurality of grossed centers to a rotating pan to form a rotating mass of grossed centers;
    h) applying a finishing syrup to said rotating mass of grossed center;
    i) drying said rotating mass of grossed centers to form a coating of at least one layer; and
    j) repeating steps g) to i) a desired number of times to form a finished coating with a desired number of layers, a desired thickness, and composition is obtained.

6. The process of claim 5, wherein steps g) to i) are reiterated between 1 and about 100 times.

7. The process of claim 5, wherein steps g) to i) are reiterated between 1 and about 5 times.

8. The process of claim 5 wherein said rotating pan has a speed of about 5 to about 40 rpm.

9. The process of claim 5 further comprising the sequential steps of:
    k) adding a wax to said rotating pan of centers;
    l) drying said rotating pan of centers to form a plurality of polished centers having a desired luster.

10. The process of claim 9 further comprising the sequential step of adding a glazing agent to said plurality of polished centers to produce a product having a desired appearance.

11. The process of claim 5 further comprising the sequential steps of adding a glazing agent to said finished coating to produce a product having a desired appearance.

12. The process of claim 1 wherein said rotating pan is selected from the group consisting of drums and belt coaters.

13. The process of claim 1 wherein said dry charge further comprises:

about 10 to about 30% of a gum base; and about 60 to about 90% of a powdered sugar.

14. The process of claim 1 wherein said dry charge further comprises: at least one colorant and at least one flavoring agent.

15. The process of claim 1 wherein said dry charge further comprise:

about 5 to about 40% of a gum base;

about 50 to about 95% of a powdered sugar;

up to about 5% of at least one colorant; and up to about 10% of at least one flavoring agent.

16. The process of claim 1 wherein said dry charge further comprises:

about 18.5% by weight of a gum base;

about 79.9% by weight of a powdered sugar; about 0.2% by weight of at least one colorant; and about 1.4% by weight of a spray-dried flavoring agent.

17. The process of claim 1 wherein said dry charge comprises an average particle size within the range of about 16 to about 100 mesh.

18. The process of claim 1 wherein said dry charge comprises an average particle size within the range of about 40 to about 60 mesh.

19. The process of claim 1 wherein said centers are selected from the group consisting of processed dextrose, hard candy, gum, taffy, fondant, dehydrated marshmallow, fruits, cordials, pre-panned confections, nuts, lozenges and medicinal tablets.

20. A coated confection produced according to the process of claim 1.

21. A coating process for coating a plurality of centers comprising the sequential steps of:

a) adding at least one colorant to a grossing syrup;

b) mixing said at least one colorant and said grossing syrup;

c) placing said plurality of centers in a rotating pan;

d) tumbling a plurality of centers in said rotating pan;

e) wetting said plurality of centers with said grossing syrup;

f) distributing said grossing syrup amongst individual centers by rotating said pan after wetting;

g) applying a dry charge comprising a gum base and a powdered bulk sweetener on said plurality of centers to absorb said grossing syrup thereby forming a plurality of powder-coated centers;

h) allowing said plurality of powder-coated centers to turn in said rotating pan and wet-back;

i) applying additional dry charge to absorb said grossing syrup to form a plurality of gum-coated centers;

j) continuing to add said additional dry charge until said plurality of gum-coated centers do not absorb said additional powdered dry charge;

k) repeating steps (d) through (j) until a desired level of coating is achieved on a plurality of grossed centers;

l) placing said plurality of grossed centers in a drying tray to dry;

m) adding aid plurality of grossed centers to a rotating pan; said rotating pan having a speed of about 5 to about 40 to form a rotating mass of grossed center;

n) applying a finishing syrup to said rotating mass of grossed centers;

o) drying said rotating mass of grossed centers to form a coating of at least one layer;

p) repeating steps m) to o) until a desired number to times to form a coating with a desired number of layers, a desired thickness, and composition is obtained thereby forming a plurality of finished centers;

q) drying said plurality of finished centers;

r) adding a wax to said rotating pan of finished centers;

s) tumbling said finished centers until shiny;

t) adding a glazing agent to said rotating pan of finished centers;

u) drying said rotating pan of finished centers.

22. The process of claim 21 wherein said rotating pan is selected from the group consisting of drums and belt coaters.

* * * * *